United States Patent
Bacon et al.

(10) Patent No.: US 6,772,153 B1
(45) Date of Patent: Aug. 3, 2004

(54) METHOD AND APPARATUS TO PROVIDE CONCURRENCY CONTROL OVER OBJECTS WITHOUT ATOMIC OPERATIONS ON NON-SHARED OBJECTS

(75) Inventors: David F. Bacon, New York, NY (US); Stephen Fink, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 09/636,718

(22) Filed: Aug. 11, 2000

(51) Int. Cl.[7] .............................................. G06F 17/30
(52) U.S. Cl. ........................................................ 707/8
(58) Field of Search ................................ 707/1, 3, 8, 9, 707/100, 103, 200, 215, 206, 205; 709/100, 103, 104, 310, 313, 315, 102; 710/200

(56) References Cited

U.S. PATENT DOCUMENTS

| | | | | |
|---|---|---|---|---|
| 4,104,718 A | * | 8/1978 | Poublan et al. ................ 707/8 |
| 5,907,675 A | * | 5/1999 | Aahlad ....................... 709/203 |
| 5,918,229 A | * | 6/1999 | Davis et al. .................. 707/10 |
| 5,931,919 A | * | 8/1999 | Thomas et al. ............. 709/315 |
| 5,996,032 A | * | 11/1999 | Baker .......................... 710/62 |
| 6,023,700 A | * | 2/2000 | Owens et al. ................. 707/10 |
| 6,314,563 B1 | * | 11/2001 | Agesen et al. .............. 717/108 |
| 6,389,452 B1 | * | 5/2002 | Glass ......................... 709/202 |
| 6,415,334 B1 | * | 7/2002 | Kanamori .................... 709/316 |
| 6,473,820 B1 | * | 10/2002 | Zhang ........................ 710/240 |

OTHER PUBLICATIONS

Bacon et al., *Thin Locks: Featherweight Synchronization For Java*, ACM Conference on Programming Language Design and Implementation (Montreal, Canada), SIGPLAN Notices vol. 33, No. 6, Jun. 1998.

* cited by examiner

*Primary Examiner*—Greta Robinson
*Assistant Examiner*—Harold E. Dodds, Jr.
(74) *Attorney, Agent, or Firm*—Ohlandt, Greeley, Ruggiero & Perle, L.L.P.; Casey P. August

(57) ABSTRACT

A lock is implemented by assigning the lock to a thread that creates the associated object. The "owning thread" can thereafter acquire and release the lock without any atomic operations. If another thread attempts to acquire the lock, the non-owning thread sends a message to the owning thread, requesting permission to acquire the lock. At some point, the owning thread receives the message from the non-owning thread and changes the state of the lock such that future lock/unlock operations use atomic operations that support object sharing.

12 Claims, 6 Drawing Sheets

ID
METHOD AND APPARATUS TO PROVIDE CONCURRENCY CONTROL OVER OBJECTS WITHOUT ATOMIC OPERATIONS ON NON-SHARED OBJECTS

FIELD OF THE INVENTION

This invention relates generally to digital data processing systems and methods and, in particular, relates to digital data processing systems having objects that can be locked and unlocked, and shared or not shared, by an executing thread.

BACKGROUND OF THE INVENTION

Computer programs with more than one active thread of execution must control access to shared resources to ensure correctness. In order to accomplish this many programming languages and libraries provide resource locks and monitors, such as software mechanisms that control concurrent access to critical sections of code.

Previous implementations of locks and monitors rely on atomic operations, such as read/modify/write operations, that are supported by the underlying hardware. In this case synchronization primitives are typically required to arbitrate between simultaneous attempts to lock an object. However, due to the required synchronization operations, it is expensive to support atomic operations, even in systems (such as those running the Java™ language) where many objects may not be shared or locked by multiple threads. As system clock speeds continue to increase, these synchronization operations will become relatively even more expensive.

OBJECTS AND ADVANTAGES OF THE INVENTION

It is a first object and advantage of this invention to provide an improved object locking mechanism that does not require the use of atomic operations for objects that are not shared.

It is another object and advantage of the teachings herein to enable a thread to acquire and release a lock without using atomic operations, wherein threads communicate using a message passing technique whereby a first thread sends a message to a second thread requesting permission to acquire a lock owned by the second thread, and where the second thread that owns the lock changes the state of the lock such that future lock/unlock operations use atomic operations that support object sharing.

SUMMARY OF THE INVENTION

The foregoing and other problems are overcome and the objects of the invention are realized by methods and apparatus in accordance with embodiments of this invention.

The teachings of this invention provide a simple and straightforward technique to identify a thread that is likely to be the only thread to lock an object, and to avoid synchronization operations on such objects until they are actually known to have been locked by more than one thread.

The teachings of this invention provide a technique to implement a locking mechanism for non-shared objects that does not require the use of atomic operations and related synchronization primitives. For programs where non-shared objects are common, the teachings of this invention serve to improve performance as compared to conventional resource locking mechanisms, wherein all objects, whether shared or non-shared, are locked using atomic operations.

In accordance with the teachings found herein, a lock is implemented by assigning the lock to the thread that creates the associated object. The "owning thread" can thereafter acquire and release the lock without requiring any atomic operations and/or the use of expensive synchronization primitives. If another thread attempts to acquire the lock, the non-owning thread sends a message to the owning thread, requesting permission to acquire the lock. At some point, the owning thread receives the message from the non-owning thread and changes the state of the lock such that future lock/unlock operations use atomic, system locking operations that support object sharing.

The use of this technique improves performance for programs where most objects are not shared, since for these objects, no atomic operations are necessary.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

A "thread", for the purposes of this invention, can be considered to be a sequential flow of control through the instructions of a program.

"Atomic", for the purposes of this invention, may be implied as a guarantee that an instruction or operation will appear to complete as an indivisible action.

Figure 1:
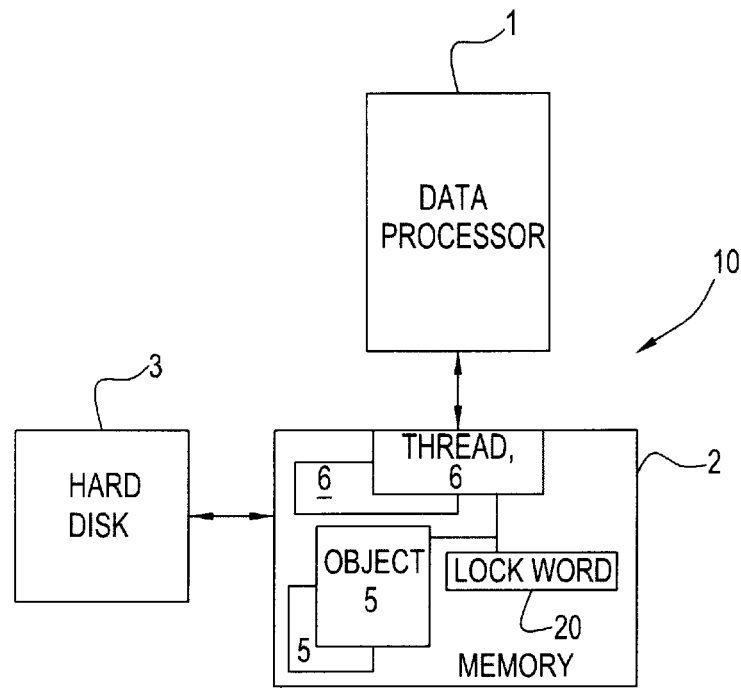
FIG. 1 is a simplified block diagram of a data processing system that is constructed and operated in accordance with the teachings herein.

FIG. 1 is a simplified block diagram of a data processing system 10 that is constructed and operated in accordance with the teachings found herein. One or more data processors 1 are bidirectionally coupled to a memory 2. Memory 2 can be loaded with data from a mass storage device, such as a hard disk 3. The data loaded into memory 2 is assumed to include program instructions for implementing the various procedures and routines described herein, including the procedures and routines depicted in the logic flow diagrams of FIGS. 3–7 and described in detail below. The memory 2 also stores various data constructions, including at least one lock word 20 of a type shown in FIG. 2, also described in detail below.

The data processing system 10 is assumed to include at least one, but typically a plurality of objects (O) 5, which are locked and unlocked in accordance with the teachings herein. At least one thread (T) 6 executes in the data processing system 10, and may "own" a lock on one or more of the objects 5.

Figure 2:
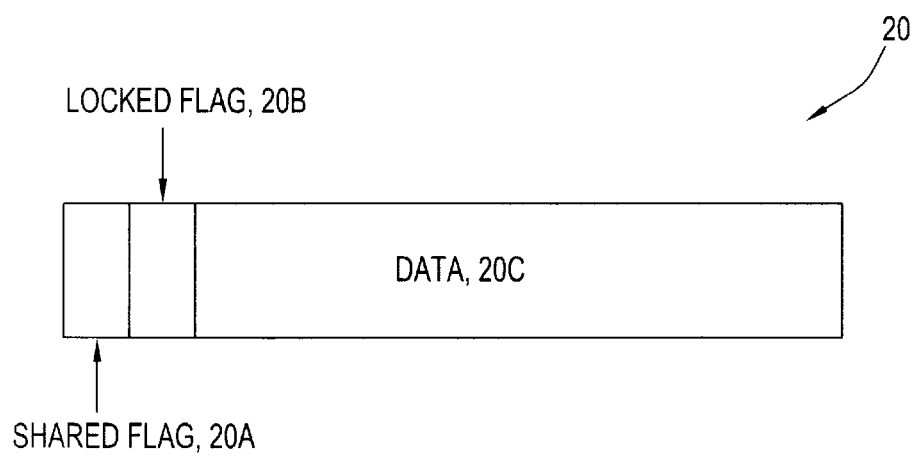
FIG. 2 shows the structure of an embodiment of a lock word.

In a preferred embodiment of this invention each object 5 has an associated word of storage, referred to herein as the lock word 20. In practice, the phrase "lock word" is used for convenience, as the amount of storage required for this function could vary from a few bits to any suitable amount of bytes or words of storage. FIG. 2 illustrates the lock word 20 for an exemplary 32-bit data processing system 10. The lock word 20 reserves one bit that is referred to as a Shared Flag 20A. When the Shared Flag 20A is set to zero, the object 5 is referred to as being non-shared. When the Shared Flag 20A is set to one, the object 5 is referred to as being shared. Each lock word 20 further reserves at least one second bit, referred to herein as a Locked Flag 20B. When the Locked Flag 20B is set to zero, the object 5 is referred to as being unlocked. When the Locked Flag 20B is set to one, the object 5 is referred to as being locked. The remaining bits (e.g., up to 30-bits) of the lock word 20 store a value, referred to as Data 20C. For a particular lock word l, one can refer to l's Shared Flag 20A, Locked Flag 20B, and Data 20C as l.shared. l.locked, and l.data, respectively.

Each running thread 6 in the system 10 has a unique integer identifier, referred to as a threadId. A thread 6 can query its own threadID with the function myThreadId. For a non-shared object 5 with lock word l, l.data holds the threadid of one thread. The identified thread 6 is referred to as the object O's owning thread, and one may say that this particular thread 6 owns the object O.

An object 5 comes into existence when it is created by a thread 6. A thread 6 creates an object 5 via a New command. The specific syntax of the New command varies according to programming language and library. For example, in C the New command is "malloc", while in C++ and Java, the command is "new". Further by example, Fortran 90 provides an "ALLOCATE" statement that functions as a New command. In any event, when the thread 6 with threadId executes a New command to create an object O, it sets the lock word 20 of O to indicate that O is non-shared (Shared Flag 20A=0), unlocked (Locked Flag 20B=0), and owned by threadid (Data 20C=threadId).

The lock implementation supports two basic operations: acquire and release. For a lock l, a thread T calls acquire(l) first, and then eventually calls release(l). In the intervening period, it can be said that thread T holds lock l. At most, one thread 6 can hold a given lock at any time. When thread T calls acquire(l), the thread T may block until some future point when the implementation can ensure that no other thread 6 holds l. When the lock acquire procedure eventually returns, it is assumed that the requesting thread T holds l. The thread T can then execute arbitrary instructions until thread T calls release(l). In a correct program, every lock acquire operation must be matched by a subsequent call to the lock release operation. For this discussion, it will be assumed for simplicity that thread 6 does not call acquire twice successively on the same object 5, without an intervening release. However, the more general case that supports recursive acquires on the same lock can be implemented by extending the number of bits of the locked flag 20B to hold a recursion count that is incremented each time that the lock is acquires, and decremented each time that the lock is released. The logic described in copending patent application "Locking and Unlocking Mechanism for Controlling Concurrent Access to Objects", by David F. Bacon, Ser. No. 08/937,311, filed Sep. 22, 1997, can be adapted straightforwardly to handle recursive locks for this invention. The disclosure of this copending patent application is incorporated by reference herein in its entirety.

The teachings of this invention assume the presence of two standard operating system mechanisms: messages and system locks. A message is defined to be some data value m.

A thread 6 can perform two operations with messages: Send and Receive. Let T1 and T2 be the threadIDs of two running threads 12. When T1 calls send(T2,m1), logically, the system 10 copies the value of m1 from T1's address space into some internal buffer. At some future point, thread T2 may call receive(m2). The receive call does not block; it returns immediately. When Receive returns, the system 10 copies some message m previously sent to T2 into T2's address space at word m2. If no previously copied message m is available for T2, the system sets m2 to a special value, NULL. Messages are standard operating system mechanisms, and have been widely documented. The semantics for the Receive operation described herein is one commonly known as non-blocking.

Finally, these teachings employ a system 10 implementation of locks, which are referred to as system locks. A system lock supports the Acquire and Release methods described previously, and the corresponding subroutines are referred to herein as systemAcquire and systemRelease. However, it is implicitly assumed that the system lock uses a different implementation than the one described in accordance with the teachings of this invention. In particular, the system lock implementation does not rely on the lock word 20 format described above.

Every modern operating system provides system locks. For example, POSIX defines a number of mechanisms between both processes and pthreads. It is assumed herein that any thread 6 can obtain a new system lock by calling a function createSystemLock, and the case is not excluded where a "system" lock is handled by an alternate dual-mode locking algorithm, such as the method described in "Thin Locks: Featherweight Monitors for Java", by D. Bacon, R. Konuru, C. Murthy, and M. Serrano, which appeared in the proceedings of the 1998 ACM Conference on Programming Language Design and Implementation. The "system lock" implementation may use the data bits of the lock word 20 to implement a less aggressive dual-mode lock, as will be evident to those skilled in the art.

It should be recalled that when an object O with lock word 20 given by l has l.shared=1, then l is shared. For shared object 5, l.data holds the identifier of a system lock associated with object O. For a system lock sl, the notation sl.identifier is used to refer to some pattern of bits that uniquely identifies sl. The actual implementation of the lock word 20 may set the Data 20C to hold a pointer to a system lock, or it may hold an index into a table holding system locks, or it may use the bits of the Data 20C for an alternate dual-mode locking algorithm. In any case, these teachings assume the existence of a function getSystemLock that returns the system lock 20 corresponding to a system lock identifier. The actual implementation of getSystemLock, and the structure of the system lock identifier, depend on the system locking implementation.

For the purpose of this description, it is assumed that the underlying system provides a sequential memory consistency model. To implement the teachings of this invention on a relaxed consistency memory model, some additional memory operations will typically be required, as will be evident to those skilled in the art.

A presently preferred algorithm is now described, in particular an algorithm for the implementation of the acquire and release methods. At a high level, the teachings of this invention use the following mechanisms:

1. When a thread T creates an object O, the system sets O to be unlocked, non-shared, and owned by T.
2. A thread T that owns an object O can acquire and release O without any atomic operations.

3. If a thread T attempts to acquire a non-shared object O that T does not own, T sends a message to O's owner, requesting that O be promoted to a shared lock. Eventually, O's owner promotes the lock to a shared lock, and thereafter, all lock operations on O occur through system locks.

4. Each thread T periodically polls for incoming messages, to ensure that all lock promotion requests are handled in a timely manner.

A presently preferred embodiment of the foregoing teachings is now described in detail. It should be appreciated that certain details, such as the format of memory words, the method of addressing system locks, and the message-passing protocol may vary between embodiments.

Figure 3:
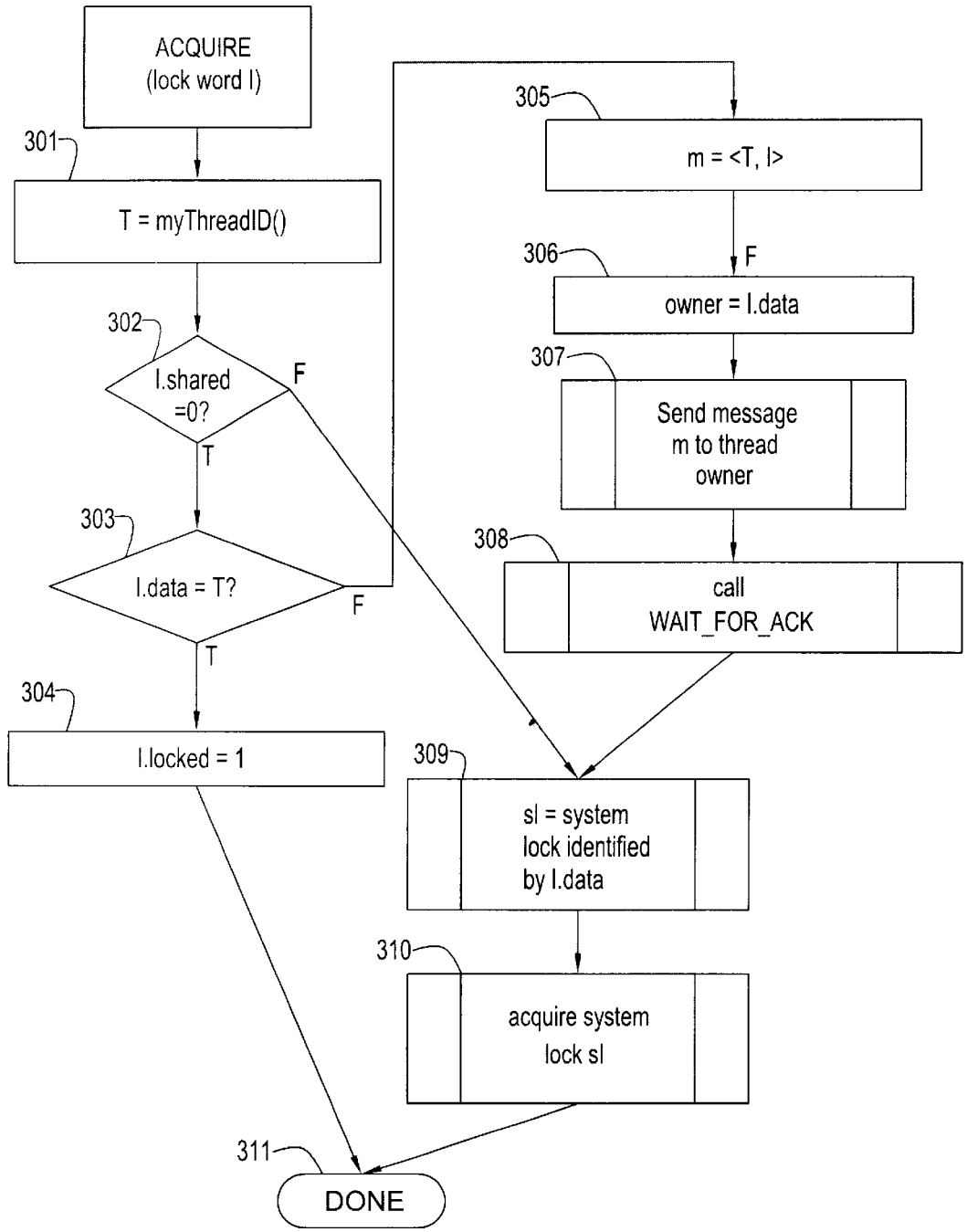
FIG. 3 is a logic flow diagram that illustrates the operation of an ACQUIRE operation.

FIG. 3 shows a procedure whereby a thread 6 ACQUIREs a lock. In FIG. 3, a thread 6 with identifier T calls Acquire on lock 1. First, at Step 301 the thread 6 caches its thread identifier in a variable T. Next, at Step 302 the thread 6 tests the Shared Flag 20A of 1. If 1's Shared Flag is 0, then the algorithm guarantees that only one thread 6 has ever locked 1, and this thread's ID is stored in 1.data (Step 303). If 1.data equals T in Step 303, then only thread T can lock 1. So, thread T may acquire the lock, and T updates the lock word at Step 304 to indicate that it holds the lock. Note that thread T issues no atomic operations. Control then passes to the Done Step 311.

If it is found that either 1.shared is not set to 0 at Step 302, or that 1.threadID does not equal T at Step 303, then T cannot lock 1 without using atomic operations to ensure correctness. If 1's object 5 is found to be non-shared in Step 303, the algorithm takes steps to promote 1's object 5 to shared. In particular, at Steps 305, 306 and 307 T sends a message to the owner of lock 1, indicating that thread T wishes to acquire the lock. As is shown in FIG. 3, at Step 307 T sends 1's owner the tuple<T,l>, that is, a message holding two values. At Step 308 T then calls subroutine WAIT_FOR_ACK (shown in FIG. 4).

Figure 4:
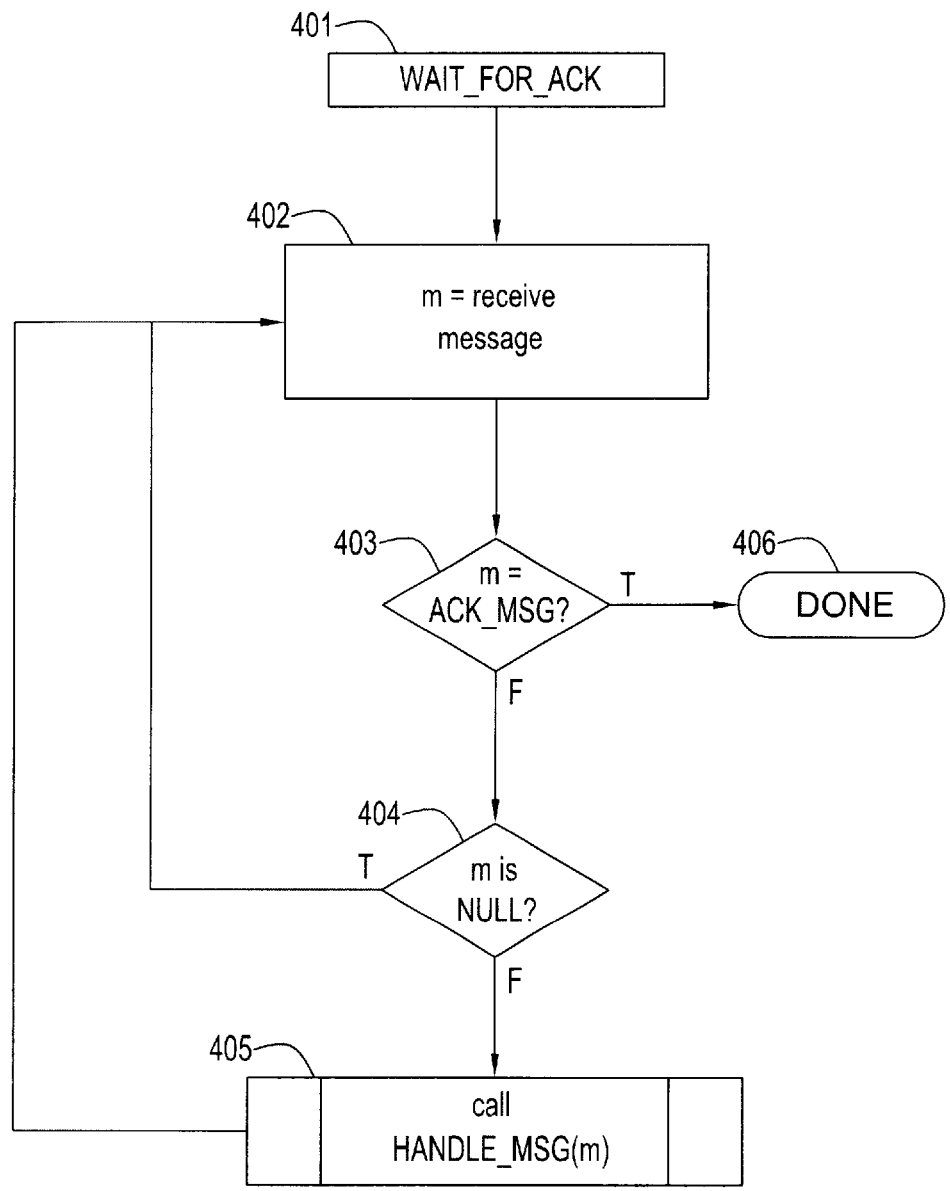
FIG. 4 is a logic flow diagram that illustrates the operation of a WAIT_FOR_ACK operation.

Referring now as well to FIG. 4, in the WAIT_FOR_ACK procedure T polls (Step 402) for incoming messages until it receives an acknowledgment, at Step 403, that lock 1 has been promoted (changed) to a system lock. When this occurs T exits the WAIT_FOR_ACK procedure at Step 406. When this acknowledgment arrives, the algorithm guarantees that 1.data holds the identifier for a system lock representing 1 (Step 309 of FIG. 3). At Step 310 the thread T then invokes systemAcquire on this system lock, which returns when T holds the lock. At Step 403, if the acknowledgment message is not received, control passes to Step 404 where a check is made if the message m is NULL. If it is, control passes back to Step 402, otherwise subroutine HANDLE_MSG (FIG. 5) is called at Step 405, after which control passes back to Step 402.

Figure 5:
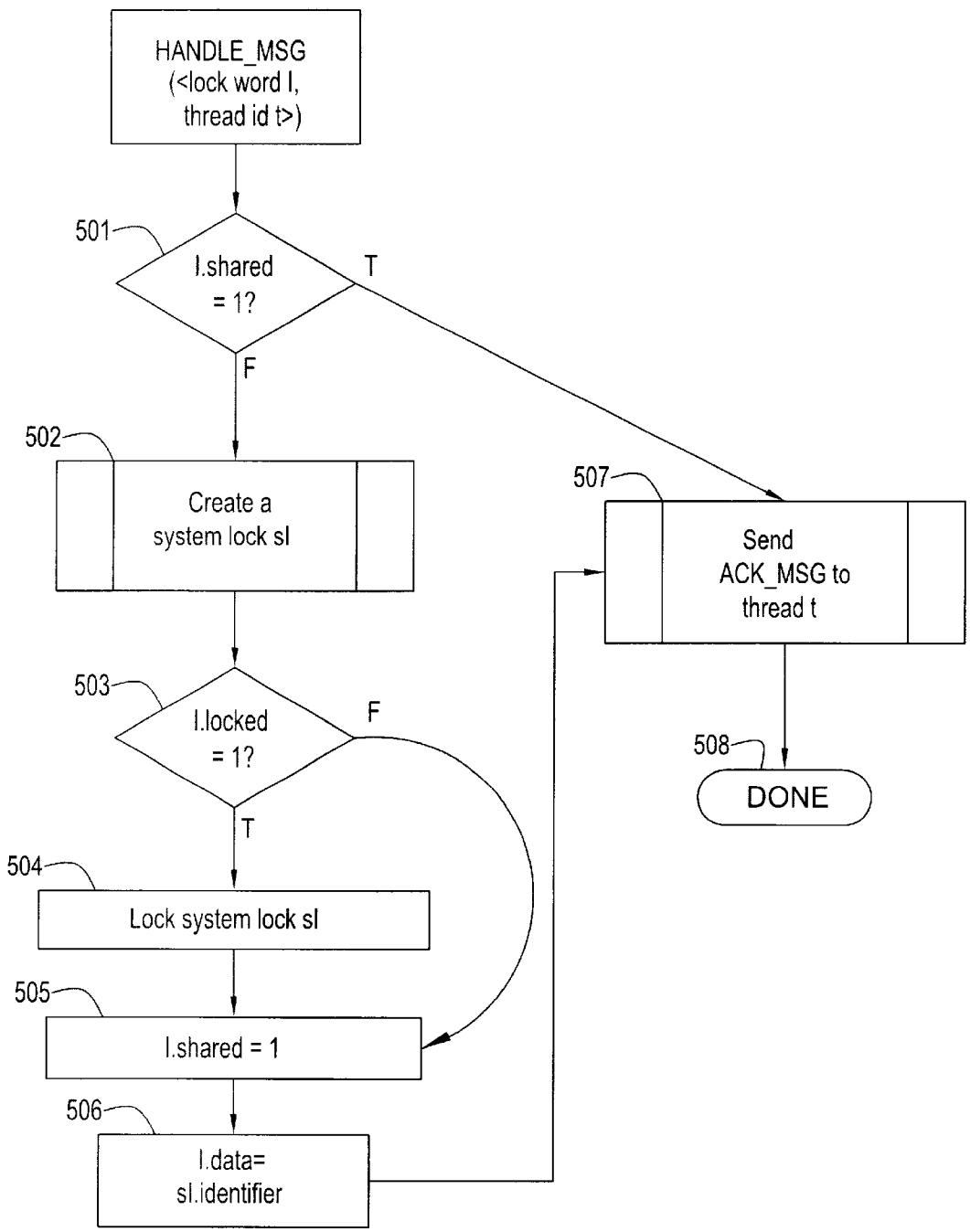
FIG. 5 is a logic flow diagram that, illustrates the operation of a HANDLE_MSG operation.

The mechanism whereby a non-shared lock is promoted to be a shared lock is now described in reference to the HANDLE_MSG procedure of FIG. 5. The first parameter of the subroutine, 1, is the lock word 20 of the lock to be promoted. The second parameter, t, is the threadID of the thread 6 that requests to acquire the lock, forcing the promotion to a "heavy" lock (i.e., a system lock that is shared using atomic operations). The thread 6 running handleMessage first checks at Step 501 to determine if 1 is currently shared. If so, then 1 has already been promoted to a heavy lock, and the handleMessage subroutine sends an acknowledgment at Step 507 to thread t, and the HANDLE_MSG procedure terminates at Step 508.

If the lock is found not to have been promoted at Step 501, the lock is promoted to be a heavy lock. The thread 6 acquires a new system lock at Step 502, and checks if the object 5 is currently locked at Step 503. If the object 5 is locked, the system lock is locked at Step 504. At Step 505 the lock word 20 is marked as shared, and the Data field 20C of the lock word 20 is updated at Step 506 to identify the new system lock. Note in this case that the identification of the thread 6 that created the object (i.e., the original owner of the object O) is now overwritten by the identification of the new system lock for object O. The acknowledgment is then sent at Step 507 to the requesting thread, t.

Figure 6:
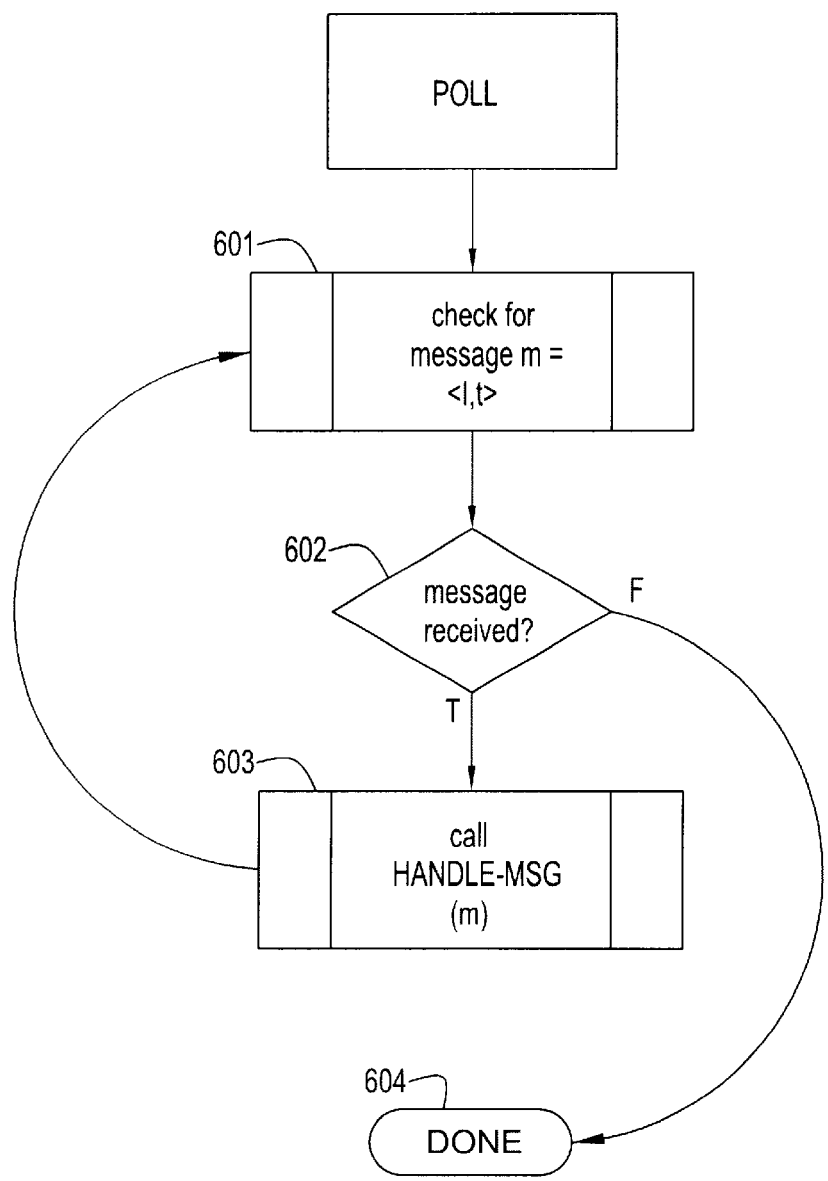
FIG. 6 is a logic flow diagram that illustrates the operation of a POLL operation.

To ensure progress, each thread 6 periodically calls the poll subroutine of FIG. 6. There are several suitable, known types of mechanisms to force a thread 6 to periodically call a subroutine. For example, in most multitasking operating systems, the operating system ensures that a special subroutine or process, referred to as a thread scheduler, runs at fixed periodic time intervals. Such a system could ensure that just before yielding the processor to the thread scheduler, each thread 6 invokes the POLL subroutine of FIG. 6. Other techniques can also be used. The teachings of this invention simply expect that each thread 6 runs the POLL subroutine within a bounded time interval.

The POLL subroutine performs two tasks. First, at Step 601 it checks for incoming messages and, if one is found, receives the incoming message at Step 602 and handles the message by invoking at Step 603 the handleMessage procedure of FIG. 5. Since each thread 6 runs the POLL subroutine periodically, each request message is guaranteed to be acknowledged in a bounded period of time, thereby avoiding deadlock in the system 10 where a particular thread T requests that a lock on a resource be promoted to a shared lock, and must then wait for this to occur before proceeding.

Figure 7:
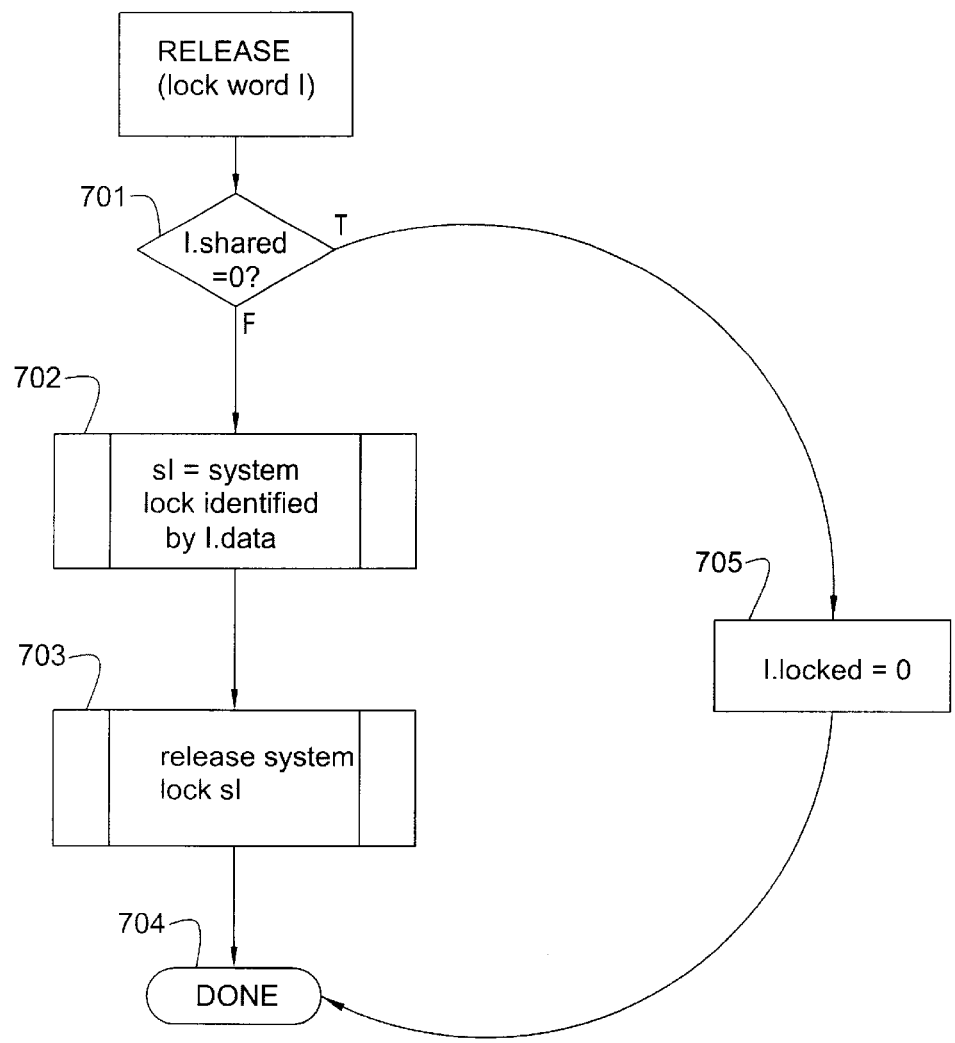
FIG. 7 is a logic flow diagram that illustrates the operation of a RELEASE operation.

The lock RELEASE procedure is now described with reference to FIG. 7. If the lock 1 is found to be non-shared at Step 701, then the calling thread 6 simply releases the lock by clearing the Lock Flag 20B st Step 705. No atomic operation is required. The RELEASE procedure then terminates at Step 704.

If the shared flag 20A is found to be a one at Step 701, the lock 1 has previously been promoted to a heavy lock. For this case, the contents of 1.data (Data field 20C) holds the identifier for the corresponding system lock, which is determined at Step 702. In this case, the calling thread 6 simply releases the system lock via systemRelease at Step 703.

While the invention has been particularly shown and described with respect to preferred embodiments thereof, it will be understood by those skilled in the art that changes in form and details may be made therein without departing from the scope and spirit of the invention.

What is claimed is:

1. A data processing system comprised of: at least one data processor and a memory, said memory for storing threads and objects created by threads, and further comprising a lock that is implemented by assigning the lock to a first thread that creates an associated object, wherein the first thread to which the lock is assigned is enabled to acquire and release the lock without requiring the use of an atomic operation wherein, in response to a second thread attempting to acquire the lock to the associated object, the second thread sends a message to the first thread, the message requesting permission to acquire the lock.

2. A data processing system as in claim 1 wherein, in response to receiving the message, the first thread changes the state of the lock such that future lock/unlock operations are performed using atomic operations that support object sharing.

3. A data processing system as in claim 1 wherein said lock is comprised of a first field for indicating a shared/not shared status of the associated object, a second field for indicating a locked/unlocked status of the associated object, and a third field for storing an identification of the thread to which the lock is assigned.

4. A method for managing locks in a data processing system, comprising steps of:
   upon an occurrence of a thread T creating an object O, setting a lock word to indicate that O is unlocked, non-shared, and owned by T;
   thereafter enabling T, that owns object O, to acquire and release O without requiring atomic operations;
   if T attempts to acquire a non-shared object O(ns) that T does not own, sending a message from T to the owner thread T(o) of O(ns), the message requesting that O(ns) be changed to a shared object O(s);
   in response to the message, changing the lock word for O(ns) to indicate O(s); and
   thereafter, performing all lock operations on O(s) through atomic system locking operations.

5. A method as in claim 4, wherein said lock word is comprised of a first field for indicating a shared/not shared status of the associated object, a second field for indicating a locked/unlocked status of the associated object, and a third field for storing an identification of the thread to which the lock is assigned.

6. A method as in claim 4, wherein each thread T periodically polls for incoming messages to ensure that all lock change requests are handled in a timely manner.

7. A method as in claim 4, wherein in response to the message, the method further comprises steps of:
   creating a system lock;
   if the object is already locked, locking the system lock;
   setting the lock word to indicate that the object is shared;
   storing an identification of the system lock into the lock word; and
   sending an acknowledgement message to the thread T that requested that O(ns) be changed to the shared object O(s).

8. A method as in claim 4, wherein said lock word is comprised of a first field for indicating a shared/not shared status of the associated object, a second field for indicating a locked/unlocked status of the associated object, and a third field for storing, when the first field indicates the not shared status of the associated object, an identification of the thread to which the lock is assigned, or when the first field indicates the shared status of the associated object, an identification of a corresponding system lock.

9. A computer program embodied on computer-readable medium, the computer program being operable for implementing a method for managing locks in a data processing system wherein threads execute, the method implemented by the computer program comprising steps of:
   upon an occurrence of a thread T creating an object O, setting a lock word in a memory of the data processing system to indicate that O is unlocked, non-shared, and owned by T, T thereafter acquiring and releasing O without requiring atomic, system locking operations;
   if T attempts to acquire a non-shared object O(ns) that T does not own, sending a message from T to the owner thread T(o) of O(ns), the message requesting that O(ns) be changed to a shared object O(s);
   in response to the message, changing the lock word for O(ns) to indicate O(s); and
   thereafter, performing all lock operations on O(s) through atomic, system locking operations.

10. A computer program as in claim 9, wherein said lock word is comprised of a first field for indicating a shared/not shared status of the associated object, a second field for indicating a locked/unlocked status of the associated object, and a third field for storing, when the first field indicates the not shared status of the associated object, an identification of the thread to which the lock is assigned, or when the first field indicates the shared status of the associated object, an identification of a corresponding system lock.

11. A computer program as in claim 9, wherein each thread T periodically polls for incoming messages to ensure that all lock change requests are handled in a timely manner.

12. A computer program as in claim 9, wherein in response to the message, the method implemented by the computer program further comprises steps of:
   creating a system lock;
   if the object is already locked, locking the system lock;
   setting the lock word to indicate that the object is shared;
   storing an identification of the system lock into the lock word; and
   sending an acknowledgement message to the thread T that requested that O(ns) be changed to the shared object O(s).

* * * * *